United States Patent [19]
Pai et al.

[11] Patent Number: 5,935,247
[45] Date of Patent: Aug. 10, 1999

[54] COMPUTER SYSTEM HAVING A GENETIC CODE THAT CANNOT BE DIRECTLY ACCESSED AND A METHOD OF MAINTAINING THE SAME

[75] Inventors: Hsin-Ying Pai, Taipei, Taiwan; Chien-Tzu Hou, Fremont, Calif.

[73] Assignee: Geneticware Co., Ltd., Road Town, Virgin Islands (Br.)

[21] Appl. No.: 08/932,689

[22] Filed: Sep. 18, 1997

[51] Int. Cl.[6] ................................................. G06F 12/14
[52] U.S. Cl. ........................ 713/200; 713/201; 713/202
[58] Field of Search .................................. 713/200, 201, 713/202; 345/204

[56] References Cited

U.S. PATENT DOCUMENTS

| | | | |
|---|---|---|---|
| 4,462,026 | 7/1984 | Munday | 713/200 |
| 4,695,838 | 9/1987 | Ellis, Jr. | 345/204 |
| 4,857,899 | 8/1989 | Ishii | 345/150 |
| 5,396,258 | 3/1995 | Zenda | 345/204 |
| 5,414,844 | 5/1995 | Wang | 713/200 |
| 5,473,338 | 12/1995 | Prince et al. | 345/204 |
| 5,542,044 | 7/1996 | Pope | 713/200 |
| 5,576,735 | 11/1996 | Kikuchi et al. | 345/204 |
| 5,699,085 | 12/1997 | Takei et al. | 713/200 |
| 5,748,888 | 5/1998 | Angelo et al. | 713/200 |
| 5,832,206 | 11/1998 | De Jesus et al. | 713/200 |
| 5,836,010 | 11/1998 | Kim | 713/200 |
| 5,867,646 | 2/1999 | Benson et al. | 713/200 |
| 5,872,916 | 12/1996 | Fukuoka et al. | 713/202 |

*Primary Examiner*—Robert W. Beausoliel, Jr.
*Attorney, Agent, or Firm*—Townsend and Townsend and Crew LLP

[57] ABSTRACT

A computer system having a genetic code that cannot be directly accessed by processors or other master devices. In the computer system of the invention, a genetic code display procedure (GDP) and a genetic code setup procedure (GSP) are required to maintain the genetic code. In the GDP, the genetic code is transmitted to a monitor under the control of the processor, but cannot be directly accessed by the processor. In the GSP, a new key-in genetic code is transmitted to a memory device storing the genetic code, but cannot be directly accessed by the processor. Therefore, the genetic code of the computer system is secure and maintainable.

23 Claims, 4 Drawing Sheets

COMPUTER SYSTEM HAVING A GENETIC CODE THAT CANNOT BE DIRECTLY ACCESSED AND A METHOD OF MAINTAINING THE SAME

BACKGROUND OF THE INVENTION

1. Field of the Invention

The present invention in general relates to a computer system with security function—more specifically, to a computer system or a data processing system having a genetic code, which is analogous to genetic codes carried by genes in organic cells. The genetic code cannot be directly accessed by a processor or any master devices, such as modems or network cards, in the system. Therefore, the genetic code can be used as a system identification number which is unique to the computer system and may serve as a seed for most encryption methods.

2. Description of the Prior Art

Networking of various computers facilitates data gathering and resource-sharing. However, networking also generates a lot of computer security problems, such as those caused by computer hackers and computer viruses. These unauthorized invaders can intercept the password employed in the computer and take over supervision of the invaded computer. Therefore, all data processed by or stored in the computer become unprotected and are easily modified or stolen by these invaders.

Currently, two security codes are employed in most of the computers: one is the system identification number, and another is the processor identification number. However, these prior art security codes still can be accessed by the processor of the computer itself or other master devices, such as network cards or modems, without knowledge of the computer's authorized user(s). In other words, an invader can intercept such a password through the processor of the computer itself. For the conventional computer system, there is no effective way to prevent such security breaches from happening.

SUMMARY OF THE INVENTION

Therefore, an object of the present invention is to provide a computer system having a genetic code that is unique to the computer system. The genetic code can not be read or modified directly by processors or any master devices, such as network cards or modems. As a result, any potential invaders, including computer hackers and computer viruses, cannot obtain the unique genetic code.

Another object of the present invention is to provide a method for maintaining the genetic code in a computer, which includes a setup procedure for modifying the genetic code and a display procedure for displaying the genetic code on a specific display monitor.

The present invention achieves the above-indicated objects by providing a computer system which comprises a memory device for holding the genetic code, an input device, an input data buffer, an activating device for activating a specific input procedure in which an input from the input device is directly stored in the input data buffer, a first switch device for switching the connection between the input data buffer and the memory device, and a first controller for controlling the first switch device according to a first control signal. Therefore, the data stored in the input data buffer will be stored in the memory device as a new genetic code when the first switch device establishes the connection between the input data buffer and the memory device. As a result, the genetic code for a computer system can only be modified by a local input device, such as a keyboard, and cannot be modified by the processor of the computer system or any other master devices.

In addition, the computer system comprises a display device, a second switch device for switching the connection between the memory device and the display device, and a second controller for controlling the switching device according to a second control signal. Therefore, the genetic code can be displayed on the display device when the second switch device establishes the connection between the memory device and the display device.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

In the present invention, a secret code, called "genetic code," serves as a system identification number of the computer system. The genetic code is unique to each computer system. The function of a genetic security code in a computer system is analogous to that of the genetic code in the immune system of human beings, which is the first immunity protection against foreign organisms in the body.

Each body has his own particular genes, which have encoded unique genetic characteristics and are displayed in a form of self-antigens on each cell in the body. All self-antigens that appear on every cells within one body are identical since each cell in one body has the same genetic code carried by the genes. Therefore, any exotic organism can be detected as a foreigner because it does not carry the proper self-antigens. In addition, exotic organism cannot change and read the genetic code. However, one can know his own genetic code by means of the DNA sequencing displayed on the gel, and the genetic code may be modified by a scientific procedure under his permission.

In light of this natural phenomenon, the present invention provides a computer system having a genetic code that is unique to this computer system. Similar to the above bioengineering case, in the present invention each computer is in advance assigned a unique genetic code. The genetic code cannot be directly read or changed by processors or any master devices, but can be displayed or set by a predefined specific maintenance procedure. Sophisticated invaders cannot employ these specific maintenance procedures to access the genetic code, and, therefore, this critical genetic code of the computer system is protected.

As described above, the genetic code cannot be accessed by processors or any other master devices. Clearly, however, a secret code that cannot be viewed or changed is meaningless. Therefore, in this embodiment, two essential maintenance procedures are provided to effectively manage the genetic code: one is for setting the genetic code in a computer system, hereafter called the Genetic code Setup Procedure (GSP), and another is for displaying the genetic code on a specific video device, such as a TV set or a monitor, hereafter called the Genetic code Display Procedure (GDP). The following discussion is focused on the practical operation of the GDP and the GSP.

Genetic Code Display Procedure (GDP)

Figure 1:
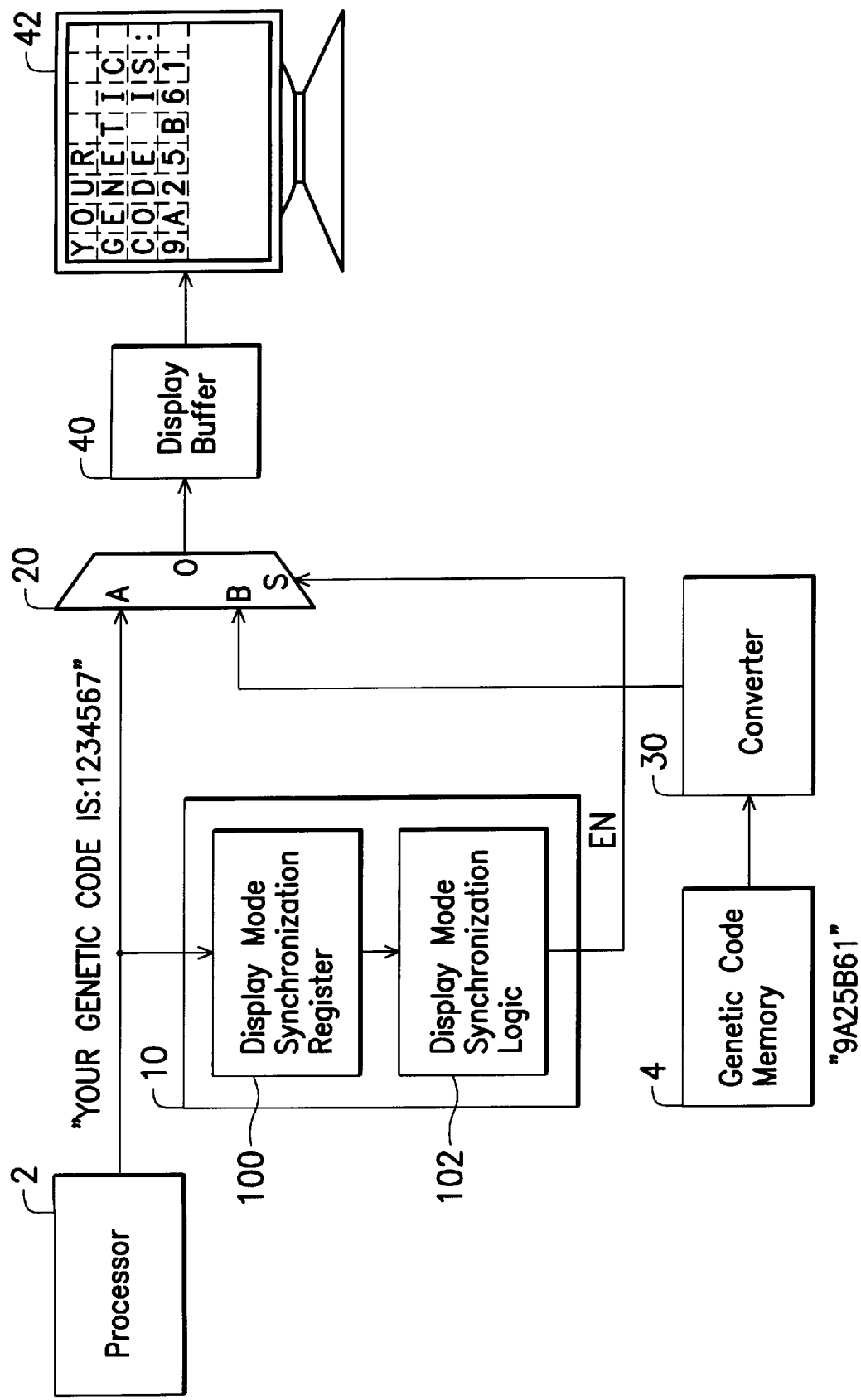
FIG. 1 is a block diagram showing the computer configuration for performing the genetic code display function in the embodiment of the present invention.

FIG. 1 is a block diagram showing the computer configuration for performing the genetic code display function in this embodiment. In the configuration of the computer system shown in FIG. 1, there are a processor 2 of the computer system, a genetic code memory 4 for holding the genetic code (in this embodiment, the genetic code is set as "9A25B61"), a display mode controller 10 for controlling the display procedure of the stored genetic code, a data switch device 20 for selecting the information that should be displayed, a converter 30 for converting the genetic HEX code into ASCII, a display buffer 40 for temporarily keeping the information that should be displayed, and a monitor 42 for displaying the genetic code.

Each element function in the computer system configuration shown in FIG. 1 will be described in detail. Processor 2, similar to the conventional processor, plays an important role in this computer system. An operator can issue a specific command to processor 2 to initialize the GDP, however, processor 2 can not reach the processed genetic code during the GDP, which will be further explained later. Display mode controller 10 accepts an initialization command from processor 2 and starts the GDP. As shown in FIG. 1, display mode controller 10 includes two functional blocks, the display mode synchronization register 100 and the display mode synchronization logic 102. The former is responsible for the interaction with software executed in processor 2 in order to control the displaying of the genetic code, and the latter is an actual hardware device that drives the genetic code to be displayed on monitor 42.

Converter 30 is used to convert the representation form of the genetic code stored in genetic code memory 4. Generally, data stored in a memory is in an incomprehensible form, such as HEX. Therefore, in this embodiment, the genetic code stored in genetic code memory 4 is preferably converted into the standard American Standard Code for Information Interchange (ASCII) format by converter 30, which is suitable for display output applications. Data switch device 20 has four terminals: input A, input B, select S and output O. Input terminals A and B, respectively, receive a predefined text string from processor 2 (in this embodiment, "YOUR GENETIC CODE IS: 1234567") and the genetic code from converter 30 (in this embodiment, "9A25B61"). Select terminal S receives an enable signal EN generated by the display mode synchronization logic 102 to electrically establish the connection between one of the two input terminals and output terminal O. In this embodiment, data switch device 20 is used to implement a data replacement technique, which is also described later. Under the control of the enable signal EN generated by display mode synchronization logic 102, the two text strings, respectively from processor 2 and converter 30, are merged and stored in the display buffer 40. Driven by a video display card (not shown) and according to the temporarily merged string, monitor 42 may show the true genetic code on the screen, as shown in FIG. 1.

The present invention adopts the data replacement technique to show the genetic code on the screen of monitor 42 without the intervention of processor 2. In this embodiment, the operation of data switch device 20 is defined as follows. When the enable signal EN is in a logic low state, input terminal A is to be electrically connected with output terminal O. When the enable signal EN is in a logic high state, input terminal B is enabled to electrically connect with output terminal O. In addition, the display mode controller 10 can generate the enable signal EN to merge the two messages, the predefined text string received from processor 2, and the genetic code text string received from converter 30 by controlling the switching operation of data switch device 20. Display mode synchronization register 100 is used to activate the whole display mode controller 10 according to a control command issued by processor 2. The display mode synchronization register 100 has a set of flags for setting the status of the display mode controller 10. In addition, display mode synchronization logic 102 can further analyze the predefined text string received from the processor 2 to decide a specific position of the predefined text string for incorporating the predefined text string with the genetic code. For example, the predefined text string in this embodiment is "YOUR GENETIC CODE: 1234567", in which a part of the string, "1234567", is meaningless and should be replaced by the true genetic code. Therefore, in this embodiment, display mode synchronization logic 102 can decide the position of the string portion "1234567" as the specific position for replacing by a pattern-recognition technique or a letter-counting technique. The pattern-recognition technique is to compare the predefined text string sent by the processor 2 with a predefined form, such as "YOUR GENETIC CODE IS: xxxxxxx", thereby deciding the right insertion point. The letter-counting technique is to determine in advance a letter count that represents the right insertion point and, during the analysis process, to count the predefined text string by the letter count. For example, in the embodiment, the predetermined letter count is 21 (including spaces). While counting the 22nd letter in the predefined text string, the display mode synchronization logic 102 may generate the enable signal EN to activate the switching function of data switch device 20.

Figure 2:
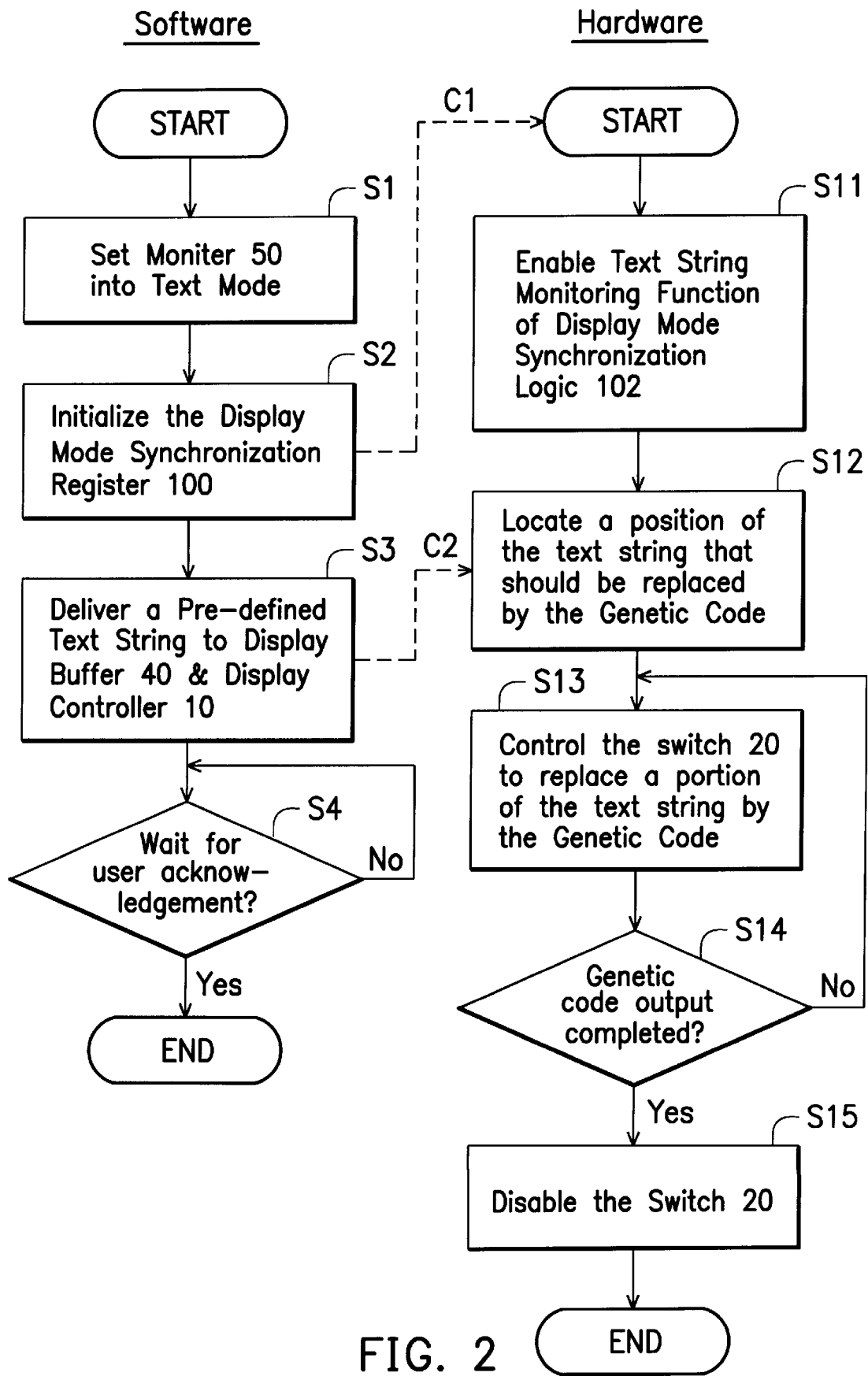
FIG. 2 illustrates a flowchart of the genetic code display procedure in the embodiment of the present invention.

FIG. 2 illustrates the genetic code display procedure in this embodiment. As shown in FIG. 2, hardware and software must cooperate to fulfill the GDP for the genetic code. The hardware elements have been illustrated in FIG. 1, while the software is executed by processor 2. However, it should be noted that the software or processor 2 cannot access the genetic code during the GDP. Referring to FIG. 1, all steps in the GDP will be described in detail as follows.

The starting point of the GDP is activated by software. In this embodiment, step S1 sets the monitor 42 in a text mode, because the genetic code can only be displayed in the text mode. This setting operation can be easily implemented by issuing a mode-setting command to the video driver (not shown) that controls the monitor 42. It should be noted that the enable signal EN is usually in the logic low state, which represents the configuration of connecting input terminal A and output terminal O.

Step S2, a second software step, is to initialize the display mode synchronization register 100, further activating the display mode controller 10. In this step, a first software-to-hardware synchronization C1 happens. The display mode controller 10 is then activated and will perform its own function.

Step S11, a first hardware step, is to enable the text string-monitoring function of display mode synchronization logic 102, as described above. The display mode synchronization logic 102 may adopt the pattern-recognition technique or the letter-counting technique to decide the right insertion point within the predefined text string sent by processor 2.

Step 3, a third software step, is to deliver the predefined text string, "YOUR GENETIC CODE: 1234567," to the display buffer 40 through the data switch device 20 and the display mode controller 10. In this step, a second software-to-hardware synchronization happens. The delivered text string is temporarily stored in the display mode synchronization register 100 and awaits analyzing by the display mode synchronization logic 102. Meanwhile, the letters within the predefined text string are sent one-by-one to the data switch device 20, and further sent to the display buffer 40 when the enable signal EN is in the logic low state.

Step S12, a second hardware step, is to locate a position of the predefined text string for inserting the true genetic code. Step S12 is performed by the display mode synchronization logic 102.

Step S13, a third hardware step, is to control the data switch 20 to replace a portion of the text string sent by the processor 2 with the genetic code. This controlling mechanism is determined by the display mode synchronization logic 102. The display mode synchronization logic 102 issues the enable signal EN in the logic high state to alter the switching operation of the data switch device 20 in response to the timing of sending the null genetic code "1234567" to the display buffer 40. Therefore, a merged text string "YOUR GENETIC CODE IS: 9A25B61" is stored in the display buffer 40. Using the conventional video-driving technique, the merged text string can be displayed on the monitor 42.

Step S14, a fourth hardware step, is to judge whether the output procedure of the true genetic code is completed or not. This step ensures that the true genetic code is indeed output to the monitor 42.

Step S4, a fourth software step, is to await the user's acknowledgement. This is a last software step to close the software control in the GDP.

Step S15, a fifth hardware step, is to disable the data switch device 20 by the display mode synchronization logic 102 when the true genetic code is completely output. Such a process is used to prevent unauthorized access to the true genetic code temporarily stored in the display buffer 40. However, it is evident that step S15 is optional if the data switch device 20 only permits one-way data transfer. It means that any data stored in the display buffer 40 cannot be read through the data switch device 20. In addition, the display mode controller 10 may turn off its own operation or wait for hardware reset to resume normal operation.

According to the above discussion, the GDP of this embodiment can display the true genetic code on a display device. More importantly, the processor 2 can only initialize and control the GDP, but can not access the true genetic code during the GDP. In addition, in this embodiment, the monitor 42 is a local and predetermined display device. That is, any unauthorized invader may enter the computer system by means of networking and starts the GDP, but can not redirect the output of the true genetic code to a different display device. Therefore, an embedded genetic code, which can only be displayed on a video device by a special procedure, is established in this computer system.

Genetic Code Setup Procedure (GSP)

Figure 3:
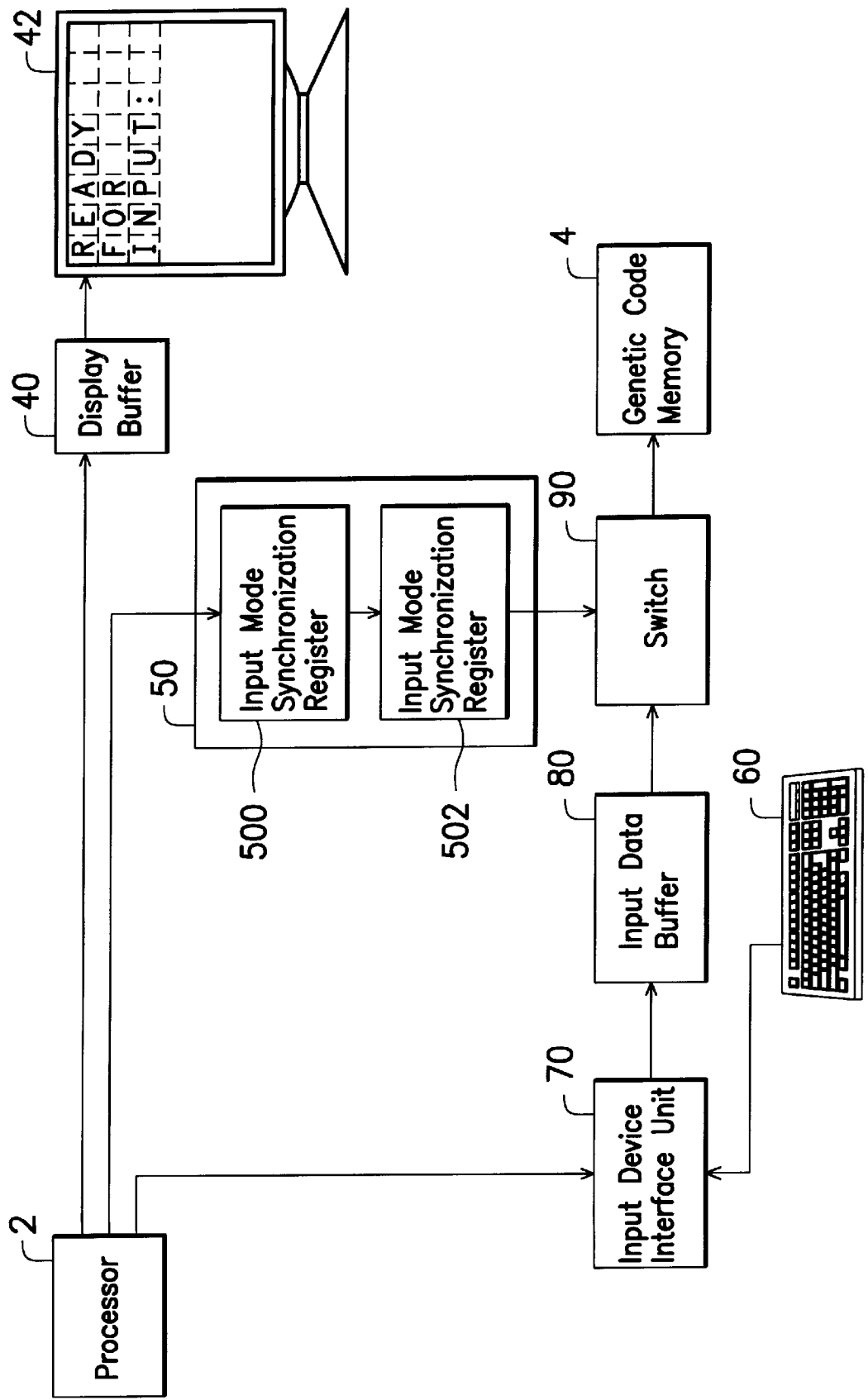
FIG. 3 is a block diagram showing the computer configuration for performing the genetic code setup function in the embodiment of the present invention.

FIG. 3 is a block diagram showing the computer configuration for performing the genetic code setup function in this embodiment. In the configuration of the computer system shown in FIG. 3, there are the processor 2 of the computer system, the genetic code memory 4 for holding the genetic code, an input mode controller 50 for controlling the setup procedure of the genetic code, a keyboard 60, an input device interface unit 70 for controlling the keyboard 60, an input data buffer 80, and a data switch device 90 for connecting or disconnecting between input data buffer 80 and genetic code memory 4. In FIG. 3, the processor 2, the display buffer 40 and the monitor 42 are the same as those in FIG. 1 and will not be further discussed.

Each element function in the computer system configuration shown in FIG. 3 will be described in detail. Similar to the case of the GDP, an operator can issue a specific command to processor 2 to initialize the GSP, however, the processor 2 cannot directly modify the genetic code during the GSP, or read the new genetic code. The keyboard 60 serves as an input device in the normal operation state. Any data input by the keyboard 60 is processed by a standard normal input data response procedure. In such a response procedure, the processor 2 incorporated with other components in the computer system processes the key-in data. It means that the conventional key-in procedure may allow the processor 2 to access the key-in data, which is not allowed during the GSP of this embodiment.

Therefore, input device interface unit 70 in this embodiment must disable the conventional data response procedure and initialize a special input response procedure, in which the key-in data from the keyboard 60 must be directly transmitted to the input data buffer 80 implemented by memory devices. Consequently, the new input genetic code can be temporarily stored in the input data buffer 80, isolated from the processor 2.

The input mode controller 50 controls the genetic code setup procedure under the operator's supervision. As shown in FIG. 3, the input mode controller 50 includes two functional blocks: an input mode synchronization register 500, and an input mode synchronization logic 502. The former is responsible for the interaction with software executed in the processor 2 in order to control the setup procedure of the genetic code, and the latter is an actual hardware device responsible for the setup of the new genetic code. The input mode synchronization register 500 is used for activating the input mode controller 50 in response to an initialization command issued by the processor 2. In addition, the input mode synchronization logic 502 can wait for the control software executed in the processor 2 to inform it whether the input of the new genetic code has finished. When the key-in process for inputting the new genetic code has finished, the input mode synchronization register 502 then generates an enable signal to turn on the data switch 90, establishing the connection between the input data buffer 80 and the genetic code memory 4. Therefore, the new genetic code stored in the input data buffer 80 is transmitted to the genetic code memory 4.

Figure 4:
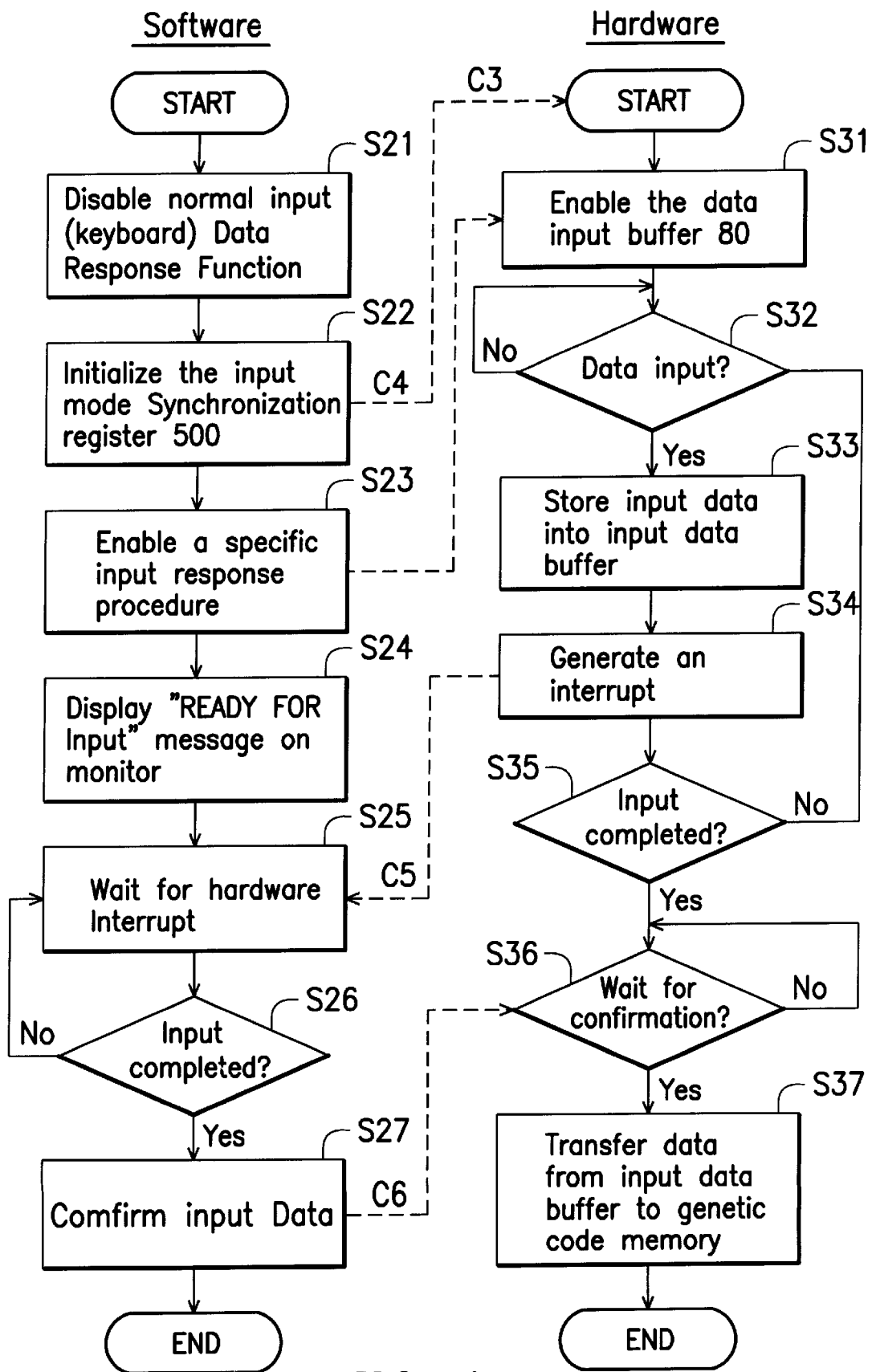
FIG. 4 illustrates a flowchart of the genetic code setup procedure in the embodiment of the present invention.

FIG. 4 illustrates the genetic code setup procedure (GSP) in this embodiment. As shown in FIG. 4, hardware and software must cooperate to fulfill the GSP for setting a new genetic code. The hardware elements have been illustrated in FIG. 3, while the software is executed by the processor 2. However, it is important that the software or processor 2 cannot provide the new genetic code in the GSP, which means that the unauthorized invaders have no chance to modify the system genetic code through the processor 2. In addition, the processor 2 also cannot access the genetic codes, including the old genetic code and the new input genetic code, during the GSP. Referring to FIG. 3, all steps in the GSP will be described in detail as follows.

Similar to the GDP, the GSP is also initiated by software. In this embodiment, step S21 is to disable the normal input (keyboard) data response function. The normal input device response is disabled so that the software executed in the processor 2 and the input mode controller 50 (hardware) can be synchronized for the GSP. The disable operation can be implemented by the hardware operation, such as disabling input device interrupt, or by the software operation, such as disabling interrupt response from the keyboard 60.

Step S22, a second software step, is to initialize the input mode synchronization register 500, further activating the input mode controller 50. In this step, a first software-to-hardware synchronization C3 happens. The input mode controller 50 is then activated and will perform its own function.

Followed by step S22, step S31, a first hardware step, is performed and the data input buffer 80 is enabled. The data input buffer 80 is a memory for temporarily storing the new genetic code input from the keyboard 60. In this embodiment, the data input buffer 80 can be the conventional keyboard input buffer or a specific memory device for the GSP. Note that the data input buffer 80 can not be directly accessed in the GSP by the processor 2 in order to conceal the new genetic code.

Step S23, a third software step, is to enable a specific input response procedure. This specific input response procedure is responsible for awaiting the data input from the keyboard 60 and transmitting the input data to the input data buffer 80. During this step, a second software-to-hardware synchronization C4 happens. At this time, the computer system remains in a condition of awaiting the new input genetic code.

In this embodiment, an optional step S24 is provided for announcing the current input condition. In step S24, the processor 2 output a text message, through the display buffer 40, to the monitor 42, as shown in FIG. 3. Therefore, the operator is informed that the computer system is ready for inputting the new genetic code.

In FIG. 4, software steps S25 and S26 and hardware steps S32, S33, S34 and S35 cooperate to fulfill the genetic code key-in process. In steps S32 and S33, keyboard 60 is ready to receive the data. If any data is inputted from the keyboard, the input device interface unit 70 may store the input data into the input data buffer 80. In addition, in step S34, the input device interface unit 70 also generates an interrupt signal to the processor 2 in response to each key-in letter from the keyboard 60. In this step, a hardware-to-software synchronization C5 happens. Next, the hardware step S35 and the software step S26 may examine whether the key-in process is completed or not. If the operator has not finished the key-in process, then the hardware and the software will return to step S32 and step S25, respectively, and continue to perform the key-in process. By means of the hardware-to-software synchronization C5, the hardware and the software can be synchronized during the key-in process. It is unnecessary for the processor 2 to acquire the current key-in data serving as the new genetic code. Using the interrupt sent by the hardware, the software can acquire enough information to examine whether the key-in process has been completed or not.

After completing the key-in process, the software executed by the processor 2 will ask for the operator's confirmation, ensuring that the correct genetic code has been keyed in (step S27). At the same time, the input mode controller 50 (hardware) also waits for the operator's confirmation (step S36). It is evident that only the software can provide a user interface for the operator's confirmation. Therefore, a software-to-hardware synchronization C6 is required. While receiving the operator's confirmation, the software delivers such information to the input mode controller. After receiving the confirmation message from the software, the input mode synchronization register 502 of the input mode controller 50 may generate the enable signal and send it to the data switch 90. The data switch 90 is turned on and establishes the connection between the input data buffer 80 and the genetic code memory 4.

In the final step S37, the key-in data stored in the input data buffer 80 is transmitted into the genetic code memory 4, serving as a new genetic code. At this point, the GSP is completed. After the GSP, the computer system cannot return to its normal operation by using any command. This feature is used for protecting the new genetic code. Therefore, a reset or reboot operation is required to exit from the GSP and to re-start the computer system.

According to the above discussion, the GSP of this embodiment can modify the genetic code by an input device, such as the keyboard 60 in this embodiment. More importantly, the processor 2 can only initialize and control the GSP, but cannot access the old or the new genetic code during the GSP. In addition, in this embodiment, the keyboard 60 is a local and predetermined input device. That is, any unauthorized invader may enter the computer system by means of networking and start the GSP, but cannot assign an different input device replacing this specific input device. Therefore, an embedded genetic code, which can only be modified by a special procedure, is established in this computer system.

The features of the computer system having the genetic code that cannot be directly accessed are describes as follows:

1. The genetic code is unique to the computer system and can be used as a pass code for many applications and programs. In addition, the genetic code cannot be read or changed by the processor or any master device.
2. The genetic code can be displayed on a video or graphic device through a special display procedure. However, the genetic code cannot be accessed by the processor during this specific display procedure.
3. The genetic code can be modified by a special setup procedure. However, the original genetic code and the modified genetic code cannot be accessed by the processor during this specific setup procedure. Therefore, such a genetic code is secure and maintainable.

The foregoing description of preferred embodiments of the present invention has been provided for the purposes of illustration and description. It is not intended to be exhaustive or to limit the invention to the precise forms disclosed. Many modifications and variations will be apparent to practitioners skilled in the art. The embodiments were chosen and described to best explain the principles of the invention and its practical application, thereby enabling others skilled in the art to understand the invention to practice various other embodiments and make various modifications suited to the particular use contemplated. It is intended that the scope of the invention be defined by the following claims and their equivalents.

What is claimed is:

1. A computer system having a genetic code that cannot be directly accessed, comprising:

a memory for storing the genetic code;

a display device coupled to the memory;

a switch coupled between the memory and the display device, the switch being adjustable to connect the memory with the display device in an on position to transmit and display the genetic code in the display device and disconnect the memory from the display device in an off position; and a controller coupled to the switch and receiving a control signal, the controller adjusting the switch between the on position and the off position in accordance with the control signal.

2. The computer system as recited in claim 1, further comprising a display buffer coupled between the display device and the switch for temporarily storing the genetic code displayed on the display device.

3. The computer system as recited in claim 2, wherein the controller disables the switch after transmission of the genetic code into the display buffer.

4. The computer system as recited in claim 1, further including a converter coupled between the memory and the switch for converting the genetic code in the memory into a text form for display on the display device.

5. The computer system as recited in claim 1, further comprising a processor coupled to the controller, the processor generating the control signal to the controller.

6. The computer system as recited in claim 1, wherein the controller comprises a display mode synchronization register that is activated by the control signal.

7. The computer system as recited in claim 1, wherein the control signal includes a text string, and the controller receives the genetic code from the memory through the switch and combines the text string and the genetic code to produce and display a display text in the display device.

8. The computer system as recited in claim 7, wherein the controller comprises a display mode synchronization logic which synchronizes the timing of the text string and the genetic code and controls the switch to select transmission of the text string and genetic code to the display device to display the display text.

9. The computer system as recited in claim 8, wherein the genetic code replaces at least a portion of the text string.

10. A computer system having a genetic code that cannot be directly accessed, comprising:

a memory for holding the genetic code;

an input device, coupled to the memory, for generating a new genetic code;

an input data buffer, coupled between the memory and the input device, for temporarily storing the new genetic code;

a setup switch coupled between the input data buffer and the memory, the setup switch being adjustable to connect the input data buffer with the memory in an on position to store the new genetic code in the memory and disconnect the memory from the input data buffer in an off position; and a setup controller coupled to the setup switch and activated by a setup control signal, the setup controller adjusting the setup switch between the on position and the off position in accordance with the setup control signal.

11. The computer system as recited in claim 10, further comprising an interface unit coupled between the input data buffer and the input device for activating a specific input procedure in response to an activation signal in which an input from the input device is directly stored into the input data buffer.

12. The computer system as recited in claim 11, wherein the interface unit disables an input interrupt function of the input device in response to the activation signal.

13. The computer system as recited in claim 10, wherein the setup controller determines whether the new genetic code is input into the input data buffer completely and generates an enable signal to turn the setup switch to the on position when the new genetic code is input into the input data buffer completely.

14. The computer system as recited in claim 10, further comprising:

a display device coupled to the memory;

a display switch coupled between the display device and the memory, the display switch being adjustable to connect the memory with the display device in an on position to transmit and display the new genetic code in the display device and disconnect the memory from the display device in an off position; and a display controller coupled to the display switch and receiving a display control signal, the display controller adjusting the display switch between the on position and the off position in accordance with the display control signal.

15. The computer system as recited in claim 14, further comprising a display buffer coupled between the display device and the display switch for temporarily storing the new genetic code displayed on the display switch, the display controller disabling the display switch after transmission of the new genetic code into the display buffer.

16. A computer system comprising:

a processor;

an input device coupled to the processor;

a memory device, coupled to the input device, for holding a genetic code;

a display device coupled to the memory device;

display means, coupled to the processor and the memory device, for displaying the genetic code in the display device under control of the processor, and isolating the genetic code from the processor; and setup means, coupled between the processor and the memory device, for setting a new genetic code in the memory device under control of the processor, and isolating the genetic code and the new genetic code from the processor.

17. The computer system as recited in claim 16, wherein the display means comprises:

a display switch coupled between the processor and the display device and between the memory device and the display device, the display switch being adjustable to connect the memory device with the display device in an on position to display the genetic code in the display device and disconnect the memory device from the display device in an off position; and a display controller coupled to the display switch and the processor to receive a display control signal, the display controller controlling the display switch between the on position and the off position in accordance with the display control signal.

18. The computer system as recited in claim 16, wherein the setting means comprises:

an input data buffer coupled between the memory device and the input device for storing the new genetic code;

an interface unit, coupled between the input data buffer and the input device and between the input data buffer and the processor, for activating a specific input procedure in response to an activation signal from the processor in which an input from the input device is directly stored into the input data buffer;

a setup switch coupled between the input data buffer and the memory device, the setup switch being adjustable to connect the input data buffer with the memory device in an on position to store the new genetic code in the memory device and disconnect the memory device from the input data buffer in an off position; and a setup controller coupled to the setup switch and the processor to receive a setup control signal, the setup controller adjusting the setup switch between the on position and the off position in accordance with the setup control signal.

19. A method of maintaining a computer system having a genetic code stored in a memory that is isolated from a processor to prevent direct access of the genetic code, the method comprising the steps of:

supplying a text string to a switch device which is coupled to the processor;

accessing the genetic code in the memory which is coupled to the switch device;

merging the text string with the genetic code to form a merged text;

supplying a display activation signal to activate a display device which is coupled to the switch device;

displaying the merged text in the display device; and disabling the switch device to prevent access by the processor of the genetic code in the memory or the merged text in the display device.

20. The method as recited in claim 19, wherein the step of merging the text string with the genetic code comprises replacing a portion of the text string with the genetic code.

21. The method as recited in claim 19, further comprising the steps of:

inputting a new genetic code for temporary storage in an input data buffer which is coupled between the memory and the processor;

awaiting completion of temporary storage of the entire new genetic code in the input data buffer; and transmitting the entire new genetic code from the input data buffer into the memory.

22. The method as recited in claim 21, wherein the step of inputting comprises directly storing an input in the input data buffer from an input device which is coupled to the input data buffer.

23. The method as recited in claim 21, further comprising the step of disabling an interrupt function of the input device prior to inputting the new genetic code.

* * * * *